United States Patent Office 3,369,843
Patented Feb. 20, 1968

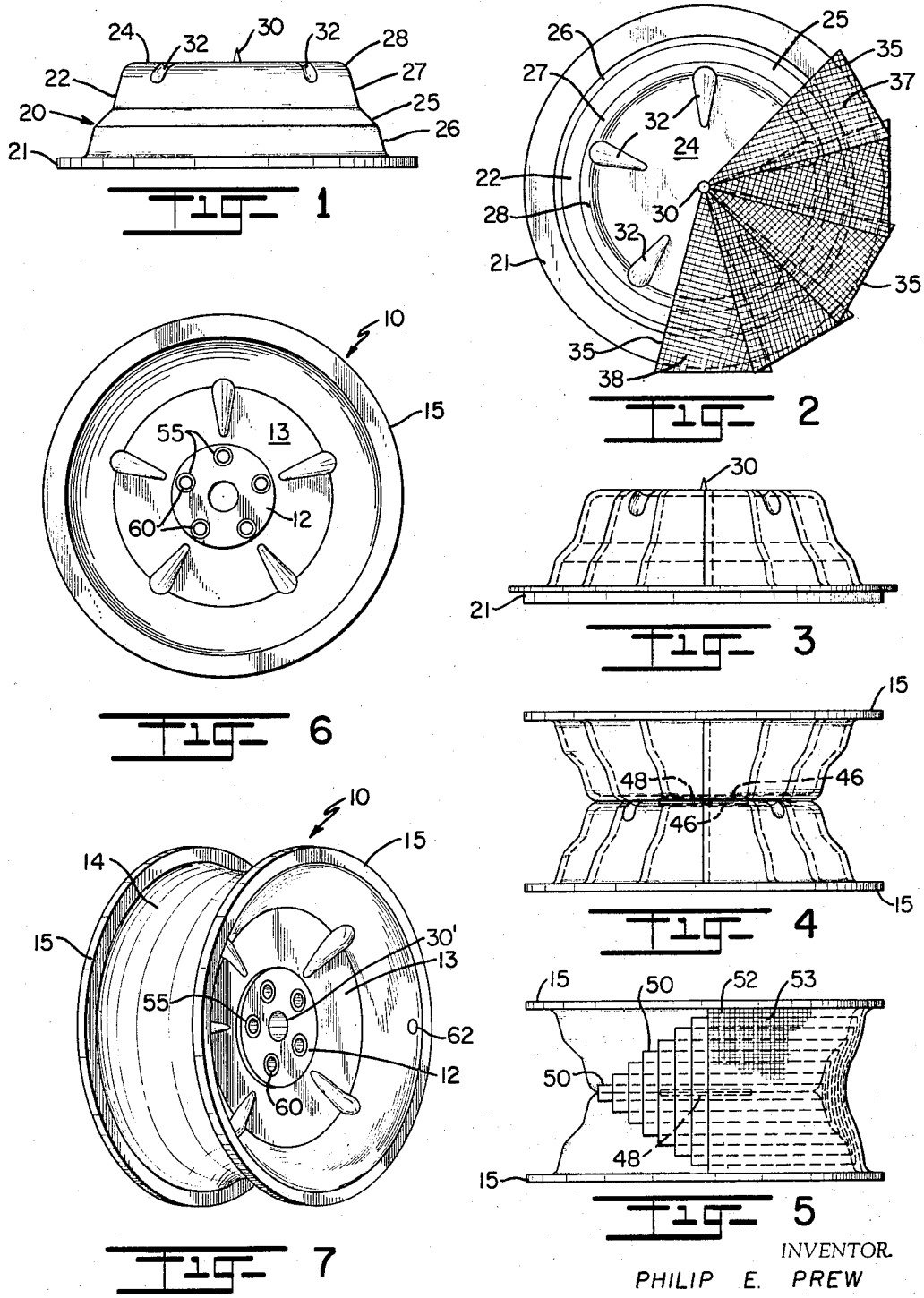

3,369,843
LAMINATED WHEEL AND METHOD
OF MANUFACTURE
Philip E. Prew, 536 Gilpin St., Denver, Colo. 80218
Filed July 16, 1965, Ser. No. 472,415
14 Claims. (Cl. 301—63)

This invention relates to new and useful vehicle wheels, and more particularly relates to a vehicle wheel and method for making same in which reinforced synthetic resin materials are combined and integrally united together to form a rigid wheel structure of unusually high strength and durability.

It is an object of the present invention to provide for an improved wheel structure which is economical to fabricate and to produce, and further in use will minimize heat build-up in the wheel under high speed running conditions.

It is another object of the present invention to provide for a high-strength, lightweight wheel structure composed of plies of reinforced resin materials which are laid up in sufficient thickness to be curable into unitary, rigid form and wherein the wheel structure of the present invention is of sufficient strength to be conformable for use in various automotive vehicles such as cars, trucks and the like.

It is a further object of the present invention to provide for a method of making a laminated wheel structure from plies of fabric reinforced resin materials and wherein the method may be suitably carried out by hand or high volume machine production to produce wheels of the requisite size and strength.

In accordance with the present invention, it has been discovered that a vastly improved wheel structure can be formed by building up a plurality of plies or laminations of internally reinforced synthetic resin materials and wherein the laminations individually are of sufficient flexibility to be shaped into desired configuration but when cured together will form a unitary rigid body having the requisite strength and wear characteristics under maximum working load condition. Thus the wheel structure can be composed entirely of plies of the reinforced resin material although a metal reinforcing plate may be incorporated into the wheel structure at the hub in order to avoid direct wear on the wheel structure at its points of connection to the axle.

Preferably the resin material employed is a glass fabric known in the trade as fiberglass cloth of very fine mesh which is commercially available in layers of thickness ranging from in the order of 3 mils to 10 mils. For example, employing a fiberglass cloth 6½ mils thick the cloth may be cut into strips of desired length and coated or impregnated with a synthetic resin, such as, polyester or epoxy resin incorporating a suitable catalyst; and when built up in a sufficient number of plies or laminations and cured together the cloth so impregnated will form a rigid wheel structure having unusually high strength and durability. As an alternative, the synthetic resin material may be reinforced with various fabrics, yarns, fibres or strain-resisting elements other than fiberglass cloth to lend the necessary strength to the wheel; however, the glass fabric reinforcement has been found to be particularly suitable for use in forming wheel structures since it can be easily shaped prior to curing and upon curing can be machined within very close tolerances; furthermore, it is easily susceptible of molding by a simplified hand or machine molding operation depending upon the volume required, and has excellent heat dissipation and strength characteristics when combined with the synthetic resin.

The above and other objects, advantages and features of the present invention will become more readily appreciated from a consideration of the following detailed description when taken together with the accompanying drawings, in which:

FIGURE 1 is a side elevational view of a mold upon which one portion of the wheel structure is formed.

FIGURE 2 is a top plan view of the mold and illustrating the manner in which plies of the material are assembled thereon.

FIGURE 3 is a front elevational view of the mold after the plies of material have been built up to the desired thickness on the mold.

FIGURE 4 is a front elevational view of a pair of wheel halves assembled together.

FIGURE 5 is a view illustrating the preferred manner in which additional plies are laid up over the assembled wheel halves.

FIGURE 6 is a front view of the completed wheel structure; and

FIGURE 7 is a somewhat perspective view of a completed wheel structure in accordance with the present invention.

Referring in detail to the drawings, a completed laminated wheel structure 10 formed in accordance with a preferred form of the present invention is illustrated in FIGURES 6 and 7 and will be seen to be comprised of an axle-receiving hub portion 12 surrounded by an outer web or spoke region 13 verging outwardly into a peripheral tire-receiving rim portion 14. In turn, the rim portion has laterally opposed, spaced apart bead-engaging seat regions 15 to establish sealed engagement with the beads of an inflatable tire, not shown, to be positioned on the rim.

The manufacturing operation and the sequence of steps followed in making the laminated wheel structure shown in FIGURES 6 and 7 will now be described with reference to FIGURES 1 to 5: In FIGURE 1, there is illustrated a generally cup-shaped circular mold 20 employed in forming one wheel-half of the resultant wheel structure. Here the mold is suitably constructed to provide an outer circular flange with an upwardly convergent wall 22 terminating in a flat upper wall surface 24. Essentially, the base or flange 21 is provided in forming the outer bead-engaging region 15 of each wheel-half with the convergent wall 22 forming one-half of the rim portion 14 of the wheel; and the upper wall surface 24 is of a configuration to form the relatively flat central hub 12 and web region 13 for each wheel-half. Most desirably, in forming the rim portion of the wheel, the convergent wall 22 has an angularly offset section 25 joining lower and upper sections 26 and 27, the upper section 27 having a rounded edge 28 curving into the top surface 24.

It will be seen that the top surface has a centering pin 30, and machined relief areas or grooves 32 are formed at spaced, circumferential intervals about the rounded edge section 28 of the mold for use in forming the web or spoke regions 13 in the front half of the wheel structure. However, in forming the rear half of each wheel structure, a circular mold corresponding to the mold 20 may be utilized but need not be provided with the machined relief areas 32, since the spokes may be incorporated in the web region of the front half more as a matter of ornamentation or design and will afford negligible radial reinforcement to the wheel structure.

In carrying out the process for each wheel-half, a length of glass fabric cloth 6½ mils in thickness is cut into generally triangular strips 35. For the purpose of illustration and not limitation, each strip may be on the order of 6 inches in width and of a length to extend from the centering pin 30 over the surface of the mold into overlapping relation with the outer flange 21. Here, a single length of fabric cloth may be employed having a width corresponding to the length of the triangular strips 35, and the strips are cut crosswise of the cloth so that when applied to the mold the warp threads represented at 37 will run circumeferentially of the mold 20 and the weft threads represented at 38 will extend radially of the mold. The strips 35 are thoroughly coated for example by brushing with a polyester resin containing a suitable catalyst just prior to application to the mold; and in succession the strips are built up in plies circumferentially around the mold with each successive strip slightly overlapping the edge of the next adjacent strip as illustrated in FIGURE 2. To lend the necessary rigidity to the resultant wheel structure the strips are laid up in successive layers over the mold so that for example the resultant wheel-half will have on the order of 10 to 15 layers or plies of the fabric reinforced synthetic resin material. A room temperature curing catalyst may be used in the synthetic resin so that the layers will undergo curing immediately upon coating and application to the mold. The front wheel-half is shown in FIGURE 3 as it would appear upon completion of the contact molding operation as described. After sufficient curing the molded wheel-half may be removed from the mold and the process repeated on a second mold corresponding in size and diameter to the mold 20. In each case, the resultant wheel-half will consist of the central hub 12 and web 13 verging into the outer rim 14 with the latter terminating in the bead-engaging portion 15. It will be noted that the hub 12 for each half is accurately centered by the centering pins 30 so as to correspond precisely in location and aligment with the hub for the other half. Upon completition of the wheel halves, the surfaces of each half are sanded smooth or otherwise machined to leave the contacting hub and web portions perfectly flat, and the outer edges of the bead-receiving portions 15 are sanded down to an exact circular configuration corresponding to the outer diameter of the mold flange 21.

In assembling the front and rear wheel halves together, preferably the central hub portions 12 are machined to provide circular recesses 46 for insertion of a circular metal flange 48 between the hub portions. Thereafter, the facing surfaces of the hub and web portions, together with the flange 48 are coated with an epoxy resin adhesive and bonded together in perfectly aligned relation to one another, the centering holes 30' formed by the centering pins 30 being perfectly aligned to assure exact centering and alignment between the wheel halves, with the rim portions 14 being arranged to extend laterally in opposite directions away from the hub and wedge portions. After allowing sufficient time for the curing cycle and firm bonding between the halves, in the relation shown in FIGURE 4, the wheel is ready for the final stage of the molding operation.

In the final molding stage, longitudinal strips 50 are formed preferably from the glass fabric cloth, and are coated again by brushing either with an epoxy or polyester resin, then applied in circumferential layers over the assembled rim portions of the connected wheel halves. As illustrated in FIGURE 5, most desirably the strips are of progressively increased thickness working outwardly from the center of the rim to the bead-engaging regions 15 so that the intermediate portion of the rim is of increased thickness in relation to the outer bead regions and most desirably an epoxy resin adhesive is employed between layers to assure a firm bond with the external surface of the wheel halves. Further, the warp threads as represented at 52 run in a circumferential direction and the weft threads 53 run in a transverse direction across the periphery of the wheel. For instance, a series of five to ten layers may be built on the rim of the wheel although this may be suitably varied according to the thickness of the fabric cloth employed and of the desired thickness and configuration of the completed wheel through the rim section.

Following completion of the cure cycle for the outer section the outer layers are machined to provide the desired final configuration and size of the wheel structure. To enable mounting of the wheel structure on a wheel axle, lug bolt holes 55 are drilled through the central hub section, including the flange 48, these holes being aligned at equally spaced, circumferential intervals about the centering hole 30'. Suitable bushings 60 may be inserted in the lug bolt holes 55 and bonded in place by employing an epoxy resin or other suitable adhesive; and external disk flanges may be bonded to the external surfaces of the front and rear halves of the wheel to lend additional reinforcement to the wheel. Another opening 62 may be drilled in the outer bead-seat engaging region of the wheel to permit insertion of the tire stems in use. Here, the disk flanges may be suitably composed of metallic or non-metallic materials, their only function being to minimize wear of the lug bolts on the hub section of the wheel. In addition, the central disk flange 48 between the mating hub sections is an optional feature, and if preferred it is entirely suitable to position disk flanges in position on opposite external surfaces of the wheel and eliminate the central disk flange 48 between the wheel halves.

The completed wheel structure formed according to the hereinbefore described method of the present invention has been found to have unusually high strength characteristics while at the same time minimizing heat buildup in the wheel and tire regions and being extremely lightweight; and furthermore will not be appreciably greater in thickness than the conventional metallic wheel structure.

While reference has been made to the use of glass fabric cloth with an epoxy or polyester resin in combination it is to be understood that the invention contemplates the use of various synthetic resins in combination with internal reinforcing materials which have the capacity of being bonded together into unitary relation, and which upon curing will afford the necessary strength and rigidity in use. It will be further evident that a single wheel-half of somewhat greater thickness than the wheel halves described with reference to FIGURES 2 and 3 may be fabricated for use as a truck wheel. Here, the fabric strips are simply laminated to comprise the desired number of layers with or without additional reinforcement by outer circumferential layers to provide a wheel structure of the requisite size, strength and rigidity in use.

Having now described a preferred form of the invention and in what manner the same is to be performed it is to be understood that various modifications and changes may be resorted to both in the construction and method of forming wheel structures without departing from the spirit and scope of the present invention as defined by the appended claims.

What is claimed is:

1. A laminated vehicle wheel structure comprising a relatively flat, axle-receiving hub section and an outer, laterally extending rim section, said hub and outer rim sections being integrally formed of a plurality of radially extending triangular plies of reinforced synthetic resin material diverging outwardly from said hub section in circumferentially overlapping relation to one another, and said plies being united to form a rigid inextensible wheel structure.

2. A laminated vehicle wheel according to claim 1, said reinforced synthetic resin material being defined at least in part by a plurality of plies of a glass fabric cloth impregnated with a polyester resin and characterized by being curable with said cloth into rigid inextensible form.

3. A laminated vehicle wheel according to claim 1, a pair of hub and outer rim sections being interconnected to define a common central hub portion with outwardly divergent rim sections, and rim sections terminating in tire bead-receiving regions.

4. A laminated wheel structure comprising wheel halves each being defined by an axle-receiving hub section and an outer, laterally extending rim section, each of said hub and outer rim sections consisting of a plurality of plies of a reinforced synthetic resin material, said hub sections being interconnected to define a common, central hub portion with oppositely directed, outwardly divergent rim sections, each of said rim sections terminating in a tire bead-receiving region, and an outer circumferential wrapping composed of a reinforced resin material being applied over and integrally united to the external surfaces of said rim sections.

5. A laminated wheel structure comprising wheel halves of generally cup-shaped configuration, each having a relatively flat hub section verging outwardly into an outer, laterally extending rim section, said wheel halves each being composed of a plurality of plies of a reinforced synthetic resin curable into rigid integrally united relation, said wheel halves being bonded together between said hub sections with said rim sections diverging outwardly in opposite directions therefrom.

6. A laminated wheel structure according to claim 5, further including a plurality of outer plies composed of synthetic resin material superimposed on said rim sections, and said plies being reinforced with circumferentially extending, strain-resisting elements therein, and said outer plies being bonded together and integrally united to said outer rim sections.

7. A laminated wheel structure according to claim 5, the plies of reinforced synthetic resin material for said wheel halves being defined by a glass fabric cloth impregnated with a polyester resin, and said plies extending continuously in circumferential, overlapping relation throughout said hub and rim sections of each wheel-half.

8. A laminated wheel structure comprising wheel halves of generally cup-shaped configuration each having a relatively flat central hub section and an outer web section, said web section verging outwardly into a laterally extending rim section, each of said wheel halves being composed of a plurality of plies of fabric reinforced polyester resin of sufficient thickness to be curable into rigid integrally united relation, said wheel halves being bonded together between said hub and web sections with said rim sections diverging outwardly in opposite directions from said connected hub and web portions, and an outer wrapping composed of a fabric reinforced synthetic resin applied circumferentially over said rim sections, and said outer wrapping being bonded together and integrally united to said outer rim sections.

9. A laminated wheel structure according to claim 8, said hub section including a metallic flange bonded to said hub section in centered relation for mounting of said wheel structure on a wheel axle.

10. A laminated wheel structure according to claim 8, said outer wrapping being composed of a plurality of plies of fabric-reinforced epoxy resin material applied in layers of increasing width from the center to the outer terminal edges of said rim sections.

11. The method of making a laminated wheel structure having a central, axle-receiving hub portion and an outer peripheral rim portion comprising the steps of assembling a plurality of plies of fabric reinforced synthetic resin material in superimposed circumferentially overlapping relation to one another on a generally cup-shaped mold, shaping the plies on the mold to define a central hub section and outer peripheral rim section of generally cup-shaped configuration, and curing the plies into a rigid unitary wheel structure.

12. The method of manufacturing a laminated wheel structure characterized by having a central, axle-receiving hub portion and an outer peripheral rim portion terminating in lateral, spaced apart bead-seat portions, said method comprising the steps of assembling a plurality of plies of fabric reinforced synthetic resin in superimposed relation to one another on a pair of circular generally cup-shaped molds to define the front and rear halves of the wheel structure, each half including a relatively flat hub section and outer peripheral rim section, curing the plies of each half together into integrally united relation, bonding the front and rear halves together between the central hub sections with the outer rim sections diverging in opposite directions away from the bonded together hub sections, and followed by applying a plurality of plies of fabric reinforced synthetic resin material circumferentially over said outer rim sections and bonding the outer plies to said rim sections to form a rigid unitary wheel structure.

13. The method of manufacturing a laminated wheel structure from laminations composed of a reinforced synthetic resin material comprising the steps of applying triangular strips of the material in superimposed circumferentially overlapping relation on a circular cup-shaped mold with the strips diverging outwardly from a central opening, shaping the strips to form a central, relatively flat supporting section verging outwardly into an outer laterally extending peripheral rim section and curing same into rigid unitary relation defining a wheel-half, bonding together a pair of the wheel halves so formed along their central supporting sections with the outer rim sections diverging laterally in opposite directions away from the central supporting sections, circumferentially wrapping plies of the reinforced synthetic resin material in progressively increasing widths over said outer rim section and bonding the outer circumferential plies into rigid unitary relation to the rim sections to define a rigid, unitary wheel structure.

14. The method according to claim 13 further including the step of bonding an axle-engaging metallic disk in centered relation between the central supporting sections.

References Cited

UNITED STATES PATENTS

| | | | |
|---|---|---|---|
| 1,442,242 | 1/1923 | Atwood | 301—63 |
| 1,561,766 | 11/1925 | Atwood | 301—63 |
| 2,267,503 | 12/1941 | Lytle | 301—63 |
| 2,448,114 | 8/1948 | Olson | 156—189 |
| 2,763,105 | 9/1956 | Feeley | 161 |
| 2,805,974 | 9/1957 | Brucker | 161 |
| 3,099,490 | 7/1963 | Ellison | 301—63 X |
| 3,115,988 | 12/1963 | Warnken | 156—189 X |
| 2,847,050 | 8/1958 | Burke | 152—404 |

FOREIGN PATENTS 885,675   12/1961   Great Britain.

RICHARD J. JOHNSON, *Primary Examiner.*

BENJAMIN HERSH, *Examiner.*